United States Patent Office 3,454,623
Patented July 8, 1969

3,454,623
PROCESS FOR MODIFYING POLYMERS AND BORON HYDRIDE/POLYMERIC COMPOSITIONS PRODUCED THEREFROM
Boynton Graham, Wilmington, Del., assignor to E. I. du Pont de Nemours and Company, Wilmington, Del., a corporation of Delaware
No Drawing. Continuation-in-part of application Ser. No. 290,892, June 25, 1963. This application Nov. 22, 1966, Ser. No. 596,075
Int. Cl. C08g *17/14;* C07f *5/02;* C08f *27/00*
U.S. Cl. 260—475                16 Claims

ABSTRACT OF THE DISCLOSURE

A process for enhancing the properties of polymers which comprises treating a polymer that is essentially free of ethylenic and acetylenic carbon-carbon unsaturation and which contains carbon-hydrogen bonds with a polyboron compound of the formula $$(M^{v+})_a[(B_nH_{n-p-r}Y_pZ_r)^{(2-r)-}]_b$$

where M is a cation; $v$ is the valence of the cation; Y is a monovalent group selected from halogen, hydroxyl, carboxyl, hydrocarbyloxyalkoxy free of ethylenic and acetylenic carbon-carbon unsaturation and containing up to 18 carbon atoms, or hydrocarbylcarbonyl free of ethylenic and acetylenic carbon-carbon unsaturation and containing up to 18 carbon atoms; $n$ is a cardinal number selected from the class consisting of 10 and 12; $p$ is a cardinal number of from 0 to $n-r$, inclusive; $r$ is a cardinal number of from 0 to 2, inclusive; Z is a group selected from tertiary amines, tertiary phosphines, sulfones, N,N-disubstituted carboxamides, carbonyl when $r$ is 2, thio ethers when $n$ is 10, nitriles when $n$ is 10, diazonium when $n$ is 10, or N,N-disubstituted sulfonamides when $n$ is 12, wherein all organic radicals in said groups are hydrocarbyl groups free of ethylenic and acetylenic carbon-carbon unsaturation containing up to 18 carbon atoms; and $a$ and $b$ are the smallest cardinal whole numbers satisfying the equation $$a = \frac{(2-r)b}{v}$$

$b$ being at least 1, and being 1 when $a$ is 0; said treatment being carried out at a temperature of between 0° and 350° C.
Polymers modified in the process are also disclosed.

---

This invention is a continuation-in-part of copending patent application Ser. No. 290,892, filed June 25, 1963, and now abandoned.

The invention relates to a method for modifying polymers and to the resulting products. More specifically, it concerns a process for modifying the properties of selected polymers by treatment of the polymer with a polyboron compound; and it concerns the product obtained from the process.

Many polymers have obtained commercial success because they have the desired combination of properties needed for a particular use. In some instances the polymers as originally prepared did not have the necessary properties, but these properties were achieved by subsequent chemical modification. In many instances, however, there is room for further improvement and for the production of new effects.

It has now been found that a number of beneficial property changes can be brought about by treating a polymer that contains carbon-hydrogen bonds and is essentially free of ethylenic and acetylenic carbon-carbon unsaturation with a polyboron compound of the formula (1) $\qquad (M^{v+})_a[(B_nH_{n-p-r}Y_pZ_r)^{(2-)-}]_b$ wherein:

B represents boron and H represents hydrogen bonded to boron;
$n$ is a cardinal number selected from the class consisting of 10 and 12, and represents the number of borons in the polyhedral cage;
M is a cation;
$v$ is the valence of the cation;
Y is a monovalent group bonded to boron by replacement of hydrogen and is selected from the class consisting of halogen, hydroxyl, carboxyl, hydrocarbyloxyalkoxy free of ethylenic and acetylenic carbon-carbon unsaturation and containing up to 18 carbon atoms, and hydrocarbylcarbonyl free of ethylenic and acetylenic carbon-carbon unsaturation and containing up to 18 carbon atoms;
$p$ is a cardinal number of from 0 to $n-r$, inclusive, and represents the number of Y groups that can replace the hydrogen bonded to boron;
Z is a group bonded to boron by replacement of hydrogen and is selected from the group consisting of a tertiary amine, a tertiary phosphine, a sulfone, an N,N-disubstituted carboxamide, carbonyl when $r$ is 2, a thio ether when $n$ is 10, a nitrile when $n$ is 10, diazonium when $n$ is 10, and an N,N-disubstituted sulfonamide when $n$ is 12, wherein all organic radicals in said groups are hydrocarbyl groups free of ethylenic and acetylenic carbon-carbon unsaturation of up to 18 carbon atoms;
$r$ is a cardinal number of from 0 to 2, inclusive, and represents the number of Z groups that can replace hydrogen bonded to boron; and
$a$ and $b$ are the smallest cardinal whole numbers satisfying the equation (2) $\qquad a = \frac{(2-r)b}{v}$ $b$ being at least 1, and being 1 when $a$ is 0;

said treatment being carried out at a atmosphere of between 0° and 350° C.

As a result of this process, at least one of the following properties of a polymer so treated is changed as follows (as will be shown in the examples, the property changes that are obtained will depend upon the nature of the polymer that is treated, and also upon the nature of the polyboron compound that is used):

Stiffness is increased. Stiffness is of importance in films, moldings, fibers, and fabrics. Appreciable changes in stiffness can be determined qualitatively by manual testing. Changes can be measured quantitatively by conventional determination of Young's modulus from stress-strain curves, obtained by ASTM methods.

Resistance to discoloration under atmospheric conditions or at elevated temperatures is increased. Resistance to discoloration at elevated temperature or under atmospheric conditions is important in films, fabrics, and other shaped articles that must keep their appearance and/or remain transparent on exposure to such conditions. It can be measured visually or by photometric methods.

Solubility and/or swellability is decreased. Resistance to solvents is of importance in shaped articles such as films, moldings and tubes that may be used in contact with organic and inorganic liquids. Change in solubility or swellability of a polymer in a given liquid may be determined by inspection.

Softening point is increased. In all types of shaped polymeric articles that may be used at relatively high temperatures, the softening point is important. Increased softening point can be indicated by an increase in zero-strength temperature and/or sticking temperature. Zero-strength temperature is defined as the temperature at which a film, fiber or other suitably shaped article fails when subjected to a given force as the temperature is gradually increased. Sticking temperature is defined as the temperature at which a solid polymer leaves a molten trail when moved across a heated brass block.

Static dissipation, i.e., ability to dissipate rapidly a charge of static electricity, is increased. Appreciable differences in static dissipation can be measured qualitatively by rubbing together manually a fabric and a piece of paper, rubber, or the like and then noting how strongly the fabric attracts or repels other objects because of any static charges thus induced, and how long such an effect lasts. Static dissipation can be measured quantitatively, through determinations of resistivity and rates of charge and discharge, by published methods described by the American Association of Textile Chemists and Colourists (AATCC). In general, improved static dissipation can be brought about in any polymer of the types mentioned above by treating it with any polyboron compound of the types mentioned above.

Dyeability is increased. Qualitative differences in dyeability can be readily determined by simple dyeing experiments under controlled conditions, methods for which are well known to those skilled in the art. Quantitative dyeability differences in materials dyed by such tests can be measured colorimetrically.

Printability is increased. This property is important in films and fabrics used for wrapping goods for sale. Printability can be determined by spreading a uniform, thin coating of printing ink on a flat film, drying the coating under controlled conditions, applying a strip of pressure-sensitive cellophane adhesive tape to the coating, pulling the tape off rapidly, and determining either visually or photometrically the amount of ink remaining on the film.

Opacity is increased. This property can be measured qualitatively by inspection or quantitatively by photometric determinations of light transmission and surface reflectivity.

Hydrophilicity is increased. Changes in hydrophilicity can be determined by observation, or by measuring the contact angle that a drop of water placed on a surface of the polymer in question makes with the surface. There are well-established, published methods for making such measurements.

Adhesion to other substrates is increased. Good adhesion is especially important for films, molded plastics, and elastomeric articles. It can be determined semiquantitatively by measuring the force necessary to bring about separation of two adhering surfaces. Adhesion measured in this manner is sometimes referred to as "peel strength." More exact quantitative determinations can be made by known methods published by the ASTM.

Ability to exhibit color changes on heating may be increased. This property is important in films and papers to be used in image formation, e.g., in office copying procedures. It can be measured visually or photometrically under controlled temperature conditions.

Resistance to combustion is increased. Resistance to combustion is important for films and fabrics, especially those used as drapes and balnkets, and for shaped plastic articles used for decorations. It can be measured by simple experiments on the rate of combustion.

Combined oxygen content is decreased. A decrease in combined oxygen content can be determined by analysis or by noting changes in the infrared absorption spectrum of a polymer, corresponding to decreases in the amount of oxygen-containing functional groups present.

Soil repellency, i.e., ease of removal of soil by washing, is improved. This property is important in fabrics, especially those used for clothing. The amount of soil in a fabric can be determined by measurement of light reflectance.

THE PROCESS

The process of the invention is carried out by maintaining a polyboron compound of the type defined previously and the polymer to be treated in intimate contact under conditions of time and temperature sufficient to bring about the desired change in properties. The polyboron compound and the polymer will be discussed in greater detail below.

Although it is not necessary to use a solvent to bring the polyboron compound and the polymer into intimate contact, treating the polymer with a solution of the polyboron compound in an inert solvent is frequently a convenient way to bring about the contact. Suitable solvents for ionic polyboron compounds include polar liquids such as water; lower alkanols (e.g., methyl, ethyl, isopropyl, tert-butyl, and hexyl alcohols); ethers( e.g., 1,2-dimethoxyethane, tetrahydrofuran, and dioxane); nitriles (e.g., acetonitrile, propionitrile, and benzonitrile); and carboxamides (e.g., dimethylformamide, dipropylacetamide, and diethylpropionamide). Because they are relatively more inert to the polyboron compounds, even at elevated temperatures, water and lower alkanols are preferred solvents, especially for polyboron acids, i.e., compounds of Formula 1 in which M is hydrogen. Water is the most preferred solvent because it is cheap. Suitable solvents for non-ionic polyboron compounds include the ethers, nitriles, and carboxamides mentioned above and, in addition, hydrocarbons (e.g., heptane, xylene, and cyclohexane) and halohydrocarbons (e.g., chloroform, ethylene chloride, bromobenzene, carbon tetrachloride, and 1,1,2-trichloro-1,2,2-trifluoroethane). When a solvent is used with a polymer that is not readily wetted by the solvent, a surface-active agent to promote wetting can be dissolved in the solvent along with the polyboron compound.

When a solvent is used, it is not necessary that the polyboron compound with which the polymer is actually to be treated by soluble in the solvent. For example, to bring into intimate contact a polymer and an insoluble salt containing a given polyboron anion, the polymer can be contacted or impregnated first with a solution of a soluble salt containing the anion and then with a solution of a soluble salt containing the desired cation, which, on contact with the first solution, causes the desired treating agent to be precipitated in intimate contact with the polymeric article.

Usually, for convenience, the polyboron compound and the polymer are brought into first contact at ordinary temperatures (20–30° C.). With relatively reactive polyboron compounds and polymers, the interaction between the two, discussed in subsequent paragraphs, can take place at these temperatures and in the presence of a solvent, if one is used. Optionally, the solvent, if any, can be removed by evaporation, preferably at ordinary temperatures, after which the polyboron compound and the polymer may interact, or continue to interact, at ordinary or elevated temperatures.

The time, temperature, and amount of the polyboron compound can vary between wide limits, depending upon the polymer to be treated, the physical form of said polymer, the particular polyboron compound used, and the desired property change or changes. As just stated, with relatively reactive polyboron compounds and polymers, the desired effects can be produced at ordinary temperatures; and in some cases they can be produced at temperatures as low as about 0° C. For less reactive systems, temperatures as high as 350° C., the actual temperature being determined in part of the stability of the polymer, may be used. For most polymers the treatment is carried out in the range 25–250° C., temperatures of 75–225° C. being especially preferred. If a solvent is used to bring the polyboron compound and the polymer into initial contact, it is usually, but not always, removed by evaporation before any treatment at temperatures above about 20–30° C. is carried out, since the treatment temperature may exceed the boiling point of the solvent, and since some operable solvents can react with certain of the polyboron compounds at higher temperatures. In some cases, however, particularly with an especially inert solvent such as water, the solvent is conveniently removed by evaporation at temperatures above its boiling point simultaneously with the treatment of the polymer.

The time can vary widely and can be as short as a few seconds or as long as several hours. Usually it is between one minute and about four hours, and most frequently between five minutes and two hours, inclusive. The process can be carried out by continuous, semi-continuous, or batch methods. The shorter times in the time ranges given above are usually involved when the process is continuous. Since the materials involved are nonvolatile and stable to atmospheric conditions the process is normally carried out in open systems at atmospheric pressure, although superatmospheric or subatmospheric pressures can be used.

The amount of polyboron compound relative to the amount of polymer is not critical and can vary extremely widely. For example, the weight ratio of polyboron compound to polymer can be as great as 100/1 or as low as 1/1000. Preferably, when the weights are known exactly, it is between 1/10 and 1/1000. In many embodiments of the process of this invention, when a solvent is used, the criterion is not the actual weight ratio but the presence of a large enough volume of a solution of the polyboron compound, at a concentration of about 0.1% or higher, to make good contact with all the polymeric material to be treated.

At the completion of the process, the polymer may be washed if desired with a solvent for the polyboron compound. The washing removes unreacted or uncombined boron compound. Whether or not the polymer has been so washed, it is usually found to have gained in weight because of its having entered into chemical combination with the polyboron compound. Such weight gains are usually between 0.01% and 20% of the weight of the untreated polymer and will of course depend to some extent on the polyboron compound/polymer weight ratio. However, as little as a 0.001% gain in weight can correspond to the production of one or more significant property changes discussed previously.

From what has been said, it will be obvious to one skilled in the art that the process of the invention can be carried out in many widely varied ways. Some of these different ways are illustrated in the examples. To illustrate, the imparting of better dyeability to a fabric can be realized by treating the fabric with a polyboron compound, following which the fabric is dyed by conventional methods; or, alternatively, the polyboron compound can be incorporated in the dyebath mixture, and thus the increasing of dyeability and the actual dyeing are carried out in a single step.

THE POLYBORON REACTANTS IN GENERAL

As can be seen from the previous definition of the polyboron reactant, they contain the polyhedral borane anions $B_{10}H_{10}^{2-}$, $B_{12}H_{12}^{2-}$, or their derivatives which are obtained by substitution reactions in which one or more of the hydrogens bonded to boron have been replaced by other groups. Thus, when $p$ is greater than 1, Y can be the same or different; and when $r$ is 2, Z can be the same or different. The nucleus of the polyboron compounds, geometrically, resembles that of a cage, and the compounds are known variously as polyhedral boron compounds, polyboron cage compounds, or $B_{10}$ and $B_{12}$ cage compounds. Hereinafter they will usually be referred to as polyboron compounds.

From the description of the polyboron compounds, it is evident the charge on the polyboron moiety may be $-2$, $-1$, or 0, depending upon the nature of the substituents introduced. Thus the compounds of Formula 1 may be divided into two subgeneric groups: those in which the polyboron moiety (the $B_nH_{n-p-r}Y_pZ_r$) does not carry a charge (i.e., its valence is zero), and those in which it does carry a charge. Whether or not it carries a charge is determined by the number of Z groups present.

The first subgeneric group is represented by the formula (3) $\qquad B_nH_{n-p-2}Y_pZ_2$ This formula is obtained from Formula 1 by letting $r$ equal 2, which means that $a$ must be zero and $b$ is 1. The compounds of this subgroup are nonionic, i.e., they do not contain, and are not readily capable of dissociating into, cations or anions.

The second subgeneric group are those compounds in which the $r$ of Formula 1 is either 0 or 1, thus making $a$ and $b$ both greater than zero. Compounds of this subgeneric group are ionic, i.e., they contain, or are capable of dissociating into, cations and anions. They may be divided into two further subgroups depending upon whether the polyboron moiety carries a $-1$ charge or a $-2$ charge.

The first such group is represented by the formula (4) $\qquad (M^{v+})_a(B_nH_{n-p-1}Y_pZ^-)_b$ where $a$ and $b$ are now the smallest positive whole numbers that satisfy the equation $a=b/v$. This formula is obtained from Formula 1 by letting $r$ equal 0. In compounds of this type the polyboron moiety is a monovalent anion.

The second such group is represented by the formula (5) $\qquad (M^{v+})_a(B_nH_{n-p}Y_p^=)_b$ where $a$ and $b$ are now the smallest positive whole numbers that satisfy the equation $a=2b/v$. The formula is obtained from Formula 1 by letting $r$ equal 0. In compounds of this type the polyboron moiety is a divalent anion.

The above Formulas 4 and 5 denote the ionic charges on the cation and anion, and the formulas can be and usually are written, for simplicity, without the charges as (6) $\qquad M_a(B_nH_{n-p-1}Y_pZ)_b$ and (7) $\qquad M_a(B_nH_{n-p}Y_p)_b$ The degree and variety of effects produced in polymers are greatest for the compounds of the type represented by Formula 5 (or 7), i.e., those containing no Z groups, and accordingly such compounds constitute a preferred class of treating agents. Within this class, compounds in which at least half the boron atoms are bonded to hydrogen, i.e., $p$ is equal to no more than one-half $n$, appear to be more reactive toward polymers generally, and therefore such compounds constitute a preferred group.

Among the polyboron compounds that do contain Z groups, those of Formula 3, i.e., those containing two Z groups, are the easier to prepare and are accordingly preferred.

Solvates of the polyboron compounds, especially hydrates of the ionic compounds, are equally as useful in the process of the invention as the unsolvated compounds, and are comprehended in the foregoing and following descriptions thereof.

In any case, the essential feature, for the purposes of this invention, is the presence of the polyboron moiety, which is represented by the $(B_nH_{n-p-r}Y_pZ_r)^{(2-r)}$-moiety of generic Formula 1. Thus, the "heart" of the process of the invention consists essentially in treating a polymer with a compound containing this grouping.

THE Z GROUP OF THE POLYBORON REACTANT

The organic radicals in the Z groups preferably contain at most 12 carbons, and most preferably, each is lower alkyl or lower alkylene. "Alkylene" as used here means a divalent, saturated, aliphatic hydrocarbyl group, e.g., tetramethylene, $-CH_2CH_2CH_2CH_2-$. Examples of Z groups are butyl dodecyl sulfide, pentamethylene sulfide, dioctadecyl sulfone, dinaphthyl sulfone, ethyl phenyl sulfone, diazonium, triethylphosphine, cyclopentyldimethylphosphine, pyridine, trioctylamine, N,N-dimethylbenzamide, N-octyl-2-pyrrolidone, cyclohexanecarbonitrile, toluonitrile, N,N-dibutyloctanesulfonamide, and N,N-diphenylmethanesulfonamide. Thio ethers are especially preferred values of Z, because of the ease of preparing both nonionic polyboron compounds (Formula 3) and ionic polyboron compounds (Formula 4) containing them. Because of simplicity of preparation, when Z groups are present in the polyboron compound, it is preferred that there be no Y substituents, i.e., that $p$ be 0.

THE Y GROUP OF THE POLYBORON REACTANT

Y is a substituent introduced into the polyboron moiety by a direct reaction or one obtained by subsequent modification of a group already introduced by direct reaction. If more than one Y group is present in the polyboron compound, they can be alike or different.

Although $B_{10}$ and $B_{12}$ compounds containing any of these substituents and others can be made, and although all of them confer desirable changes in properties on polymeric materials, certain of the derivatives are easier to make than others and/or give changes in polymer properties relatively more easily; these compounds thus constitute a preferred class within the compounds represented by Formula 7 and, in general, among the compounds of Formula 1. These preferred compounds are those in which the total number of hydroxyl, hydrocarbyloxyalkoxy, hydrocarbylcarbonyl, and carboxyl groups is at most three, and preferably at most two. These compounds can be represented by Formula 8

(8)      

where:

X is halogen;
X' is hydroxyl, hydrocarbyloxyalkoxy, hydrocarbylcarbonyl, or carboxyl;
$q$ is a cardinal number between 0 and 3, inclusive, and preferably between 0 and 2, inclusive;
$s$ is a cardinal number between 0 and $n-q$, inclusive;
$a$ and $b$ are the smallest positive whole numbers that satisfy the equation $a=2b/v$; and
the other terms are as previously defined.

Among the various hydrocarbyloxyalkoxy groups that can be present in compounds of Formula 8, and, in general, in compounds of Formula 1, those that contain at most 12 carbons constitute a preferred class, because of availability and the minimization of side reactions in the preparation and use of compounds containing them. Examples of hydrocarbyloxyalkoxy groups are 4-tetradecyloxybutoxy, methoxymethoxy, 2-(1-naphthyloxy)ethoxy, 2-butoxyethoxy, 3-phenoxypropoxy, 2-methoxybutoxy, 10-methoxydecyloxy, and 6-cyclohexyloxyhexyloxy. A more preferred class of hydrocarbyloxyalkoxy group is that in which the hydrocarbon moieties are acyclic, saturated, lower aliphatic, especially those in which the group contains a total of at most six carbons.

For the same reasons, preferred hydrocarbylcarbonyl groups in compounds of Formula 8, and, in general, in compounds of Formula 1, are those that contain 2–12 carbons. Examples are acetyl, isobutyryl, cyclohexylcarbonyl, pentamethylbenzoyl, 2-naphthoyl, cyclopropylacetyl, dodecanoyl, and 7-methyloctanoyl.

A preferred group of Y substituents is halogen, hydroxyl and carboxyl.

The preparation of $B_{10}$ and $B_{12}$ compounds of Formula 8 in which $q$ is 0, i.e., compounds in which halogen is the sole substituent, is especially easy, since only one type of substituent is present and usually, therefore, only one substitution step or only one type of substitution reaction is required. Thus, an especially preferred class of polyboron compounds are those of Formula 9

(9)      $M_a(B_nH_{n-s}X_s)_b$ where $s$ is a cardinal number between 0 and $n$, inclusive, and the other terms are as defined for Formula 8.

As previously stated, when $s$ is greater than 1, the halogens represented by X in Formulas 8 and 9 can be the same or different. The same is true in general for halogens represented by Y (since X is merely a species of Y) in Formula 1 when $p$ is greater than 1. Preferably they are the same, because of the fewer number of steps required to prepare the compounds in question. The preferred halogens, because of ease of introduction into the polyboron nuclei, are chlorine and bromine, chlorine being especially preferred for economic reasons.

Since all substituted derivatives of the $B_{10}H_{10}^=$ and $B_{12}H_{12}^=$ anions must be made from compounds containing these anions, it follows that of all the polyboron compounds that can be used in the process of the invention, those containing the unsubstituted $B_{10}H_{10}^=$ and $B_{12}H_{12}^=$ anions are available by the least number of steps, and these accordingly constitute a most preferred class.

The term "hydrocarbyl . . . free of ethylenic and acetylenic carbon-carbon unsaturation," used in the definitions of Y and Z, means that the only unsaturation that can be present in the hydrocarbyl moieties is aromatic. Thus, the term includes alkyl, cycloalkyl, aryl, alkaryl, aralkyl, and the like.

THE CATION M

The cation M is not a critical feature of the polyboron compounds. This is particularly evident from the fact that, as previously noted, some of the polyboron compounds that can be used in the process of the invention do not contain any cations.

Accordingly, in polyboron compounds of Formula 1 that do contain a cation, M can be any cation. The following paragraphs demonstrate the range and non-criticality of the cation.

A. M can be an inorganic cation. For example, it can be hydrogen, ammonium, hydrazonium, or a cation derived from any metal in the Periodic Table shown in Deming's "General Chemistry," Fifth edition, page 156 (Wiley, 1944), i.e., a metal of Groups IA–VIA inclusive, IB–VIIB inclusive, or VIII. Examples include lithium, potassium, rubidium, cesium, beryllium, magnesium, strontium, copper, mercury, barium, aluminum tin, bismuth, silver, zinc, vanadium, chromium, manganese, ruthenium, cobalt, and nickel. In addition M can be a complex cation of any such metal, e.g., tetramminecopper(II),
diamminezinc(II),
diaquotetramminechromium(III),
tris(1,2-propanediamine)chromium(III),
nitratopentamminecobalt(III),
dichlorobisethylenediaminecobalt(III),
dicyclopentadienyliron(III),
dibenzenechromium(I), and
tris(acetylacetonato)silicon.

Preferred metal cations and complex metal cations are those having a valence of at most three.

Because of availability and ease of preparation, hydrogen, ammonium, hydrazonium, and cations of metals of Groups IA, IIA, IB, and IIB of atomic number less than 57 constitute a more preferred class of inorganic cations, hydrogen, ammonium, and alkali-metal cations being especially preferred.

Polyboron compounds of Formula 1 in which M is hydrogen are ordinarily isolated as solvates. Since these compounds are most commonly worked with in aqueous media, the most common types of solvates are hydrates. The exact position of attachment of the solvate molecules is not known, but at least some of them are almost certainly associated with the hydrogen ions. It is to be understood, therefore, that the term "hydrogen," as used here, includes, and in fact essentially always refers to, hydrogen ions solvated with water or other solvent molecules. Specifically, it includes the monohydrated hydrogen ion, $H_3O^+$, which is also sometimes called the oxonium ion or the hydronium ion. When M is hydrogen, the degree of solvation of the hydrogen ion is not critical and is of no particular importance to the present invention. The above usage of the term "hydrogen" is based on nomenclature approved by the International Union of Pure and Applied Chemistry; see J. Am. Chem. Soc., 82, 5529–30 (1960).

Compounds in which M is hydrogen are readily soluble in solvents that are conveniently used in the polymer-treating process. In addition, the interaction that takes place between the polyboron compound and the polymer appears to be catalyzed by hydrogen ions, which are present in the polyboron compound when M is hydrogen. Therefore hydrogen is a most preferred cation, i.e., value of M, in compounds of Formula 7, and, in general, in compounds of Formula 1 when $r$ is 1 or 0.

B. M can be an organic or organo-inorganic cation. For example, it can be a cation of the type $Z'_2 \cdot BH_2^+$, where $Z'$ is a tertiary amine or a tertiary phosphine, usually a trialkylamine or a trialkylphosphine. It can also be any of a broad class of substituted ammonium, hydrazonium, phosphonium, and sulfonium compounds in which the substituent groups are the same or different and are organic groups bonded to the nitrogen, phosphorus, or sulfur through carbon, any multiple bond connected to which carbon is part of a ring. Two of these groups can be joined together to form a divalent organic radical. A preferred class of cations of this type, because of the stabilities of the $B_{10}$ and $B_{12}$ salts containing them, consists in monosubstituted (i.e., primary) ammonium, disubstituted (i.e., secondary) ammonium, trisubstituted (i.e., tertiary) ammonium, tetrasubstituted (i.e., quaternary) ammonium, monosubstituted hydrazonium, disubstituted hydrazonium, trisubstituted hydrazonium, tetrasubstituted hydrazonium, tetrasubstituted phosphonium, and sulfonium cations. Although the nature of the organic substituents on nitrogen, phosphorus, and sulfur in these cations is immaterial to the invention, more preferred cations, for reasons of availability, are those of the type just described in which (a) any organic group is aliphatically saturated hydrocarbyl of at lmost 18 carbons, and preferably at most 12 carbons, (b) two such groups can be joined, directly or through an oxygen hetero atom, to form a divalent hydrocarbyl or divalent, oxygen-interrupted hydrocarbyl radical of up to 18 carbons, and preferably at most 12 carbons, and (c) there is at most one aryl group bonded directly to any one ammonium nitrogen. Alternatively, these groups can be defined by the formulas $QNH_3^+$, $QQ'NH_2^+$, $QQ'_2NH^+$, $QQ'_3N^+$, $QN_2H_4^+$, $Q_2N_2H_3^+$, $Q_2Q'N_2H_2^+$, $Q_2Q'_2N_2H^+$, $Q_4P^+$, and $Q_3S^+$, where Q is aliphatically saturated hydrocarbyl of at most 18 carbons and preferably at most 12 carbons, Q' is aliphatically saturated hydrocarbyl of at most 18 carbons, and preferably at most 12 carbons, bonded through aliphatic carbon, and two Q and/or Q' groups can be joined, directly or through an oxygen hetero atom, to form a divalent, aliphatically saturated hydrocarbyl or oxygen-interrupted hydrocarbyl radical of at most 18 carbons, and preferably at most 12 carbons. Examples are methylammonium,
cyclopropylammonium,
1-methylheptylammonium,
2-(1-naphthyl)ethylammonium,
octadecylammonium,
diisobutylammonium,
dicyclohexylammonium,
dinonylammonium,
morpholinium,
dodecamethyleniminium,
triisopropylammonium,
N-methylpiperidinium,
pyridinium,
4-methylquinolinium,
trihexylammonium,
benzyltrimethylammonium,
tetraisopentylammonium,
dodecyltrimethylammonium,
phenylhydrazonium,
tridecylhydrazonium,
1-methyl-1-phenylhydrazonium,
1-methyl-2-isopropylhydrazonium,
dodecylhydrazonium,
1,1,2-triethylhydrazonium,
1,1,1-triheptylhydrazonium,
tetramethylhydrazonium,
tetrabenzylhydrazonium,
tetramethylphosphonium,
tetrabenzylphosphonium,
tetra(1-naphthyl)phosphonium,
ethyltri(decyl)phosphonium,
benzylhexadecyldimethylphosphonium,
benzyldodecyldimethylphosphonium,
dihexylmethylphenylphosphonium,
2,4,6-trimethylphenyltrimethylphosphonium,
isobutylethylmethylisopropylphosphonium,
ethylpentamethylene-p-tolylphosphonium,
dimethyloctadecylsulfonium,
triphenylsulfonium,
methyltetramethylenesulfonium,
benzyldodecylmethylsulfonium, and
methyldipentylsulfonium.

Cations of the above types containing only lower alkyl groups, especially those in which all alkyl groups are the same, are especially preferred. The tetramethylammonium cation is a most preferred cation of this type, because it provides an economical way of getting polyboron salts that, because of their sparing solubility, resist being removed from polymeric materials by rinsing treatments.

M can also be a polybasic, preferably dibasic, substituted ammonium, substituted phosphonium, or sulfonium cation of the types described above, i.e., one in which two or more, but preferably two, nitrogen, phosphorus, or sulfur atoms are joined by one or more divalent organic groups. Again for reasons of availability, preferred cations of this type are those in which (a) any monovalent organic group is aliphatically saturated hydrocarbyl of at most 18 carbons, and preferably at most 12 carbons, (b) any divalent organic group is aliphatically saturated hydrocarbyl or aliphatically saturated, oxygen-interrupted hydrocarbyl of at most 18 carbons, and preferably at most 12 carbons, and (c) there is at most one aryl group bonded to any one nitrogen atom. Examples are ethylenebis(ethylammonium), hexamethylenediammonium, N,N'-dimethylpiperazinium, 1,2 - phenylenebis(methylenetriethylphosphonium), ethylenebis(dodecylmethylsulfonium), and m-phenylenediammonium.

Examples of polyboron compounds that can be used in the process of the invention include the following:

$[(CH_3)_3S]_2B_{10}H_9OH$
$H_2B_{10}H_8(OH)_2$
$[(CH_3)_2N_2H_3]_2B_{10}H_8Cl_2$
$CaB_{10}H_6Cl_4$
$(NH_4)_2B_{10}H_4F_6$
$K_2B_{10}H_8F_2$
$MgB_{10}Br_{10}$
$M_2B_{10}H_9COCH_3$
$(C_6H_5N_2H_4)_2B_{10}I_{10}$ $[(C_4H_9)_4P]_2B_{10}H_9OCH_2CH_2OCH_3$
$(i\text{-}C_3H_7NH_3)_2B_{10}H_{10}$
$CuB_{10}H_2Cl_8$
$[(C_2H_5)_4N]_2B_{10}H_6Br_4$
$SrB_{10}H_3Br_7$
$[(CH_3)_4N]_2B_{10}HBr_9$
$Na_2B_{10}H_7I_3$
$BaB_{10}H_4BrI_5$
$Zn(NH_3)_4B_{10}I_{10}$
$Na_2B_{10}H_5Cl_3F_2$
$Tl_2B_{10}H_9OH$
$[(C_3H_7)_4N]_2B_{10}H_8(COC_6H_5)_2$
$[(CH_3)_4N]_2B_{10}H_8(COC_{17}H_{35})_2$
$(NH_4)_2B_{10}H_8(COC_{11}H_{23})_2$
$(CH_3)_3PCH_2CH_2P(CH_3)_3B_{10}H_9OCH_2CH_2OCH_3$
$[(CH_3)_4N]_2B_{10}Cl_9OCH_2CH_2OCH_3$
$Na_2B_{10}Br_9COC_6H_5$
$H_2B_{10}Cl_9OH$
$[(CH_3)_4N]_2B_{10}Cl_8(OH)_2$
$Ag_2B_{10}H_5Cl_5$
$[(CH_3)_4N]_2B_{10}H_3Cl_6OH$
$H_2B_{10}H_8(OCH_2CH_2CH_2OC_6H_5)_2$
$Co(H_2NCH_2CH_2NH_2)_3B_{10}H_5Cl_5$
$PbB_{10}H_8I_2$
$Mn(H_2O)_6B_{10}Br_{10}$
$HgB_{10}H_5Br_5$
$Fe_2[B_{10}H_8(OH)_2]_3$
$NaB_{10}H_9SO_2(C_2H_5)_2$
$Mg[B_{10}H_9S(C_6H_{11})_2]_2$
$LiB_{10}H_8IP(C_4H_9)_3$
$NH_4B_{10}H_9N(CH_3)_3$
$(CH_3)_3SB_{10}Cl_9NCC_2H_5$
$Ba[B_{10}H_9HCON(CH_3)_2]_2$
$Ca(B_{10}H_6Br_3N_2)_2$
$HB_{10}H_8FN(C_2H_5)_3$
$B_{10}H_6F_2[SO_2(C_4H_9)_2]_2$
$B_{10}H_7OH[S(C_6H_{13})_2]_2$
$B_{10}H_8[P(C_3H_7)_3]_2$
$B_{10}H_8(NCC_5H_{11})_2$
$B_{10}H_8(N_2)_2$
$B_{10}H_8[HCON(C_6H_{13})_2]_2$
$B_{10}H_8(CO)_2$
$B_{10}Cl_8(CO)_2$
$B_{10}H_8N_2S(CH_3)_2$
$[(C_3H_7)_4N]_2B_{10}H_9COOH$
$(NH_4)_2B_{10}H_8(COOH)_2$
$H_2B_{10}Cl_8(COOH)_2$
$Na_2B_{10}Br_8(COOH)_2$
$[n\text{-}C_{11}H_{23}NH_3]_2B_{10}H_{10}$
$[(C_3H_7)_2NH_2]_2B_{10}H_{10}$
$BaB_{10}H_{10}$
$[(CH_3)_4N]_2B_{10}H_3I_5(COOH)_2$
$(N_2H_5)_2B_{12}H_8F_4$
$[(C_2H_5)_4N]_2B_{12}H_{11}OH$
$[(C_2H_5)_2NH_2]_2B_{12}H_{10}(OH)_2$
$Co(NH_3)_6B_{12}H_6Cl_6$
$SnB_{12}H_4Cl_5F_3$
$[(C_6H_5)_4P]_2B_{12}H_{10}I_2$
$H_2B_{12}H_{11}COC_6H_5$
$Ag_2B_{12}H_{11}OCH_2CH_2OCH_3$
$[(CH_3)_4N]_2B_{12}H_{11}Cl$
$ZnB_{12}H_6Br_6$
$H_2B_{12}H_2Br_{10}$
$Cs_2B_{12}H_3Br_6Cl_3$
$(NH_4)_2B_{12}Cl_5I_7$
$Na_2B_{12}F_4Cl_3Br_2I_3$
$(C_5H_5NH)_2B_{12}H_5Cl_6COC_6H_5$
 ($C_5H_5NH$ is pyridinium)
$(NH_4)_2B_{12}H_9(OH)_3$
$H_2B_{12}H_8(OH)_4$
$SrB_{12}Cl_8(OH)_4$
$H_2B_{12}H_{11}COC_{15}H_{31}$
$H_2B_{12}H_{10}(COC_6H_{11})_2$
 ($C_6H_{11}$ is cyclohexyl)
$Cs_2B_{12}HCl_{10}OH$ $[(C_3H_7)_4N]_2B_{12}Br_{11}OH$
$[(CH_3)_4N]_2B_{12}H_3Br_8OCH_2CH_2OCH_3$
$Cs_2B_{12}H_{11}COOH$
$H_2B_{12}H_{10}(COOH)_2$
$[(CH_3)_4N]B_{12}H_7I_3(COOH)_2$
$[(C_4H_{94}P]_2B_{12}Br_{11}OH$
$Rb_2B_{12}Cl_{10}(COOH)_2$
$[(CH_3)_4N]_2B_{12}H_2Cl_8(COOH)_2$
$[(C_6H_{13})_4N]_2B_{12}Cl_{12}$
$Eu_2(B_{12}Cl_{12})_3$
$H_2B_{12}H_6(OH)_6$
$(tert\text{-}C_4H_9NH_3)_2B_{12}(OH)_{12}$
$K_2B_{12}H_{10}F_2$
$Ag_2B_{12}Cl_{10}(OCH_2CH_2OCH_3)_2$
$Li_2B_{12}Cl_{12}$
$Cu(H_2O)_4B_{12}Br_{12}$
$(C_9H_7NH)_2B_{12}Cl_{12}$
 ($C_9H_7NH$ is quinolinium)
$BeB_{12}H_{12}$
$CdB_{12}H_{12}$
$(morpholinium)_2B_{12}H_{12}$
$K_2B_{12}H_{12}$
$NaB_{12}H_{11}CH_3CON(CH_3)_2$
$Ca[B_{12}H_{11}SO_2(C_2H_5)_2]_2$
$B_{12}HCl_9(CO)_2$
$B_{12}H_{10}(CO)_2$
$B_{12}H_7I_3(CO)_2$
$NH_4B_{12}H_{11}N(C_4H_9)_3$
$LiB_{12}H_{11}C_4H_9SO_2N(C_6H_{13})_2$
$HB_{12}Br_6Cl_5P(CH_3)_3$
$B_{12}H_{10}[CH_3CON(CH_3)_2]_2$
$B_{12}H_{10}[SO_2(CH_3)_2]_2$
$B_{12}H_{10}[C_4H_9SO_2N(C_2H_5)_2]_2$
$B_{12}H_9I[P(C_2H_5)_3]_2$

The polymers

The range of polymers that can be used in the process of the invention includes any polymer that contains carbon-hydrogen (C–H) groups, and is essentially free of ethylenic and acetylenic carbon-carbon unsaturation. By the term "essentially free of ethylenic and acetylenic carbon-carbon unsaturation" is meant that the polymer contains essentially no aliphatic double or triple bonds. But this term does not exclude aromatic unsaturation which is a special kind of unsaturation not covered by the terms "ethylenic" and "acetylenic." Thus, the definition of the polymers used in the process of this invention includes polymonoolefins such as polystyrene, polyethylene, polypropylene or copolymers of both, since termination of the growth of the chain occurs either by addition of two chain radicals or an initiator radical resulting in a polymer having no ethylenic bonds in it; or by disproportionation, resulting in a polymer having an ethylenic bond at one end of the chain. Since these latter polymers contain only about one ethylenic bond per polymer molecule, they are essentially free of ethylenic bonds. However, the definition of the polymers does exclude polydioleflins such as polybutadiene since they contain one ethylenic unit for every monomeric unit making up the polymer chain.

As can be seen from the definition of the polymers, they can be synthetic polymers, naturally occurring polymers, or naturally occurring polymers that have been chemically altered through synthetic reactions. The modifications produced in the polymers by the process of this invention are more easily produced in polymers that are tractable, i.e., that are fusible or soluble or swellable in available solvents. Such polymers are essentially linear (i.e., little crosslinking between chains) and more often occur in the synthetic or chemically modified natural polymers. These constitute a preferred class.

Neither the molecular weight nor the mode of preparation of the polymers used in the process of this invention is a critical factor in the selection of the polymers. For example, the molecular weight can range from below 6000 to above 100,000 or more; and the polymers can be prepared by such processes as (a) condensation polymerization (e.g., polyamides prepared from dibasic acids and diamines or amino acids; and polyurethans from diisocyanates and glycols), (b) ring-opening polymerization (e.g., a polyalkylenimine, a polyoxymethylene from trioxane, or a polyamide from a lactam), or (c) addition polymerization (e.g., polyethylene, polyacrylonitrile, or polyoxymethylene from formaldehyde). Any of the usual initiators for such purposes can be employed in preparing the polymers, e.g., free-radical initiators such as peroxides and azonitriles, ionic initiators, redox systems or coordination catalysts.

The polymers employed in the novel process can be homopolymers or copolymers. It is preferred that they be essentially free of the monomer from which they are formed.

Most of the commercially important polymers that can be used in the process of the invention, regardless of their mode of formation, are linear polymers in which (1) at least half of the intralinear atoms are carbon; (2) at least half of these intralinear carbons are also bonded to hydrogen; (3) the intralinear atoms which are not carbon are selected from oxygen, sulfur, or nitrogen, particularly oxygen or nitrogen, and when nitrogen, the third bond (i.e., the bond not making up the chain links) is preferably bonded to hydrogen or alkyl of up to eight carbon atoms.

It is to be understood that groups of contiguous atoms among those atoms that form the chain can be part of a ring. Examples of this include the benzene rings of polymeric esters of terephthalic acid, the cyclic anhydride rings of maleic anhydride copolymers, the cyclic acetal rings of acetals of polyvinyl alcohol, the anhydroglucose rings of cellulose, and the cyclic imide rings of certain polyimides.

Examples of some classes of polymers falling within the foregoing definitions and some specific examples thereof include:

Polyolefins (polyethylene, polypropylene, polyisobutylene).
Polyarylolefins (polystyrene, polychlorostyrene).
Polyhaloolefins (polyvinyl fluoride, polyvinyl chloride, polyvinylidene fluoride).
Polyvinyl alcohol and its esters (polyvinyl alcohol, polyvinyl acetate, polyvinyl benzoate).
Polyvinyl ethers (polyvinyl methyl ether, polyvinyl-2-methoxyethyl ether).
Polyacrylic acid and its functional derivatives (polyacrylic acid, polyethylacrylate, poly-2-chloroethyl acrylate, polyacrylonitrile, polyacrylamide).
Polymethacrylic acid and its functional derivatives (polymethacrylic acid, polymethyl methacrylate, polyisobutyl methacrylate, polymethacrylonitrile, polymethacrylamide).
Polyalkylenimines (polyethylenimine).
Polyalkylene oxides (polyethylene oxide, polytetramethylene oxide).
Polyalkylene polysulfides (polyethylene polysulfide).
Polyaldehydes (polyformaldehyde; also known as polyoxymethylene).
Polyamides, including polypeptides (polyhexamethyleneadipamide, polyhexamethylenesebacamide, poly - ε - caprolactam, polyglycine, polyleucine).
Polyimides (poly(pyromellitimidodiphenyl ether)).
Polyesters (polyethylene terephthalate, polypivalolactone, polyglyceryl phthalate).
Polyurethans (polyethylene phenylenebiscarbamate).
Polyureas (polyhexamethyleneurea).
Formaldehyde condensation polymers (urea/formaldehyde, phenol/formaldehyde, and melamine/formaldehyde copolymers).
Cellulose.
Regenerated cellulose (xanthate cellulose, cuprammonium cellulose).
Cellulose ethers (ethylcellulose, 2-hydroxyethylcellulose, 2-cyanoethylcellulose).
Cellulose esters (cellulose acetate, cellulose propionate, cellulose acetate-butyrate, cellulose nitrate).
Wool.

A more specific definition of the polymers is that they are linear polymers in which (1) at least half of the intralinear atoms are carbon; (2) at least half of these intralinear carbons are also bonded to hydrogen; (3) the carbons not bearing hydrogen are each bonded to a group selected from halogen (especially chlorine and fluorine), hydroxy, oxo, cyano, hydroxymethyl, amino and salts thereof, hydrocarbyl, hydrocarbyloxycarbonyl, and hydrocarbylcarbonyloxy, wherein hydrocarbyl is defined as free of ethylenic and acetylenic carbon-carbon unsaturation and of up to eight carbon atoms; (4) the intralinear atoms which are not carbon are selected from oxygen, sulfur, or nitrogen, particularly oxygen or nitrogen, and when nitrogen, the third bond (i.e., the bond not making up the chain links) is preferably bonded to hydrogen or alkyl of up to eight carbon atoms.

Also operable are copolymers containing two or more types of repeating units, at least one of which is a repeating unit of a type of polymer described above. Examples are:

Ethylene/propylene, ethylene/vinyl acetate, ethylene/vinyl chloride, ethylene/carbon monoxide, ethylene/sulfur dioxide, vinyl fluoride/vinylidene fluoride, vinylidene fluoride/hexafluoropropylene, acrylonitrile/isobutylene, and styrene/maleic anhydride copolymers; acrylonitrile/methyl acrylate/sodium styrenesulfonate and tetrafluoroethylene/isobutylene/acrylic acid terpolymers; polyhexamethyleneadipamide/polyhexamethylenesebacamide copolymers and polyethylene terephthalate/polydecamethylene terephthalate copolymers; copolyester-amides from hexamethylenediamine, decamethylene glycol, and adipic acid; copolyurethans from tetramethylene glycol, phenylene diisocyanate, and glycerol; copolyurethan-ureas from polytetramethylene ether glycol, 4,4'-diisocyanatodiphenylmethane, and 1,4-diaminopiperazine, and from polytetramethylene ether glycol, 4-methyl-1,3-phenylene diisocyanate, 4,4'-diisocyanatodiphenylmethane, hydrazine, and methyliminobis(propylamine).

In addition, physically compatible mixtures of any two or more of the foregoing types of polymers are operable.

The polyesters, polyamides and polyimides are preferred.

The polymers can be treated by the process of the invention in any form, e.g., as shaped objects, in bulk, or in dispersions or solutions. However, since shaping of the polymer may become more difficult after treatment with the polyboron compound, polymers are usually treated in the form of shaped objects, e.g., as films, fibers (including fabrics), moldings, or tubes, and this method constitutes a preferred embodiment.

PREPARATION OF THE POLYBORON
COMPOUNDS.— $B_{10}$ COMPOUNDS

Ammonium decahydrodecaborate, $(NH_4)_2B_{10}H_{10}$, can be prepared in quantitative yield by the reaction of a decaboryl bis(lower dialkyl sulfide), e.g., decaboryl bis(dimethyl sulfide), $B_{10}H_{12}[(CH_3)_2S]_2$, with liquid ammonia at a temperature between about —50° C. and 0° C. The product is isolated simply by evaporating any excess, unreacted ammonia. This process is described in detail in U.S. 3,148,938, issued in the name of Walter H. Knoth, Jr. The decaboryl bis(lower dialkyl sulfide) is prepared by allowing decaborane, $B_{10}H_{14}$, to react with a lower dialkyl sulfide at a temperature of at least 0° C., and preferably at least 25° C., until approximately one mole of hydrogen per mole of decaborane is evolved. This process is described in detail in U.S. 3,154,561, issued in the name of Earl L. Muetterties.

The ammonium cation in $(NH_4)_2B_{10}H_{10}$ and the cations in compounds containing substituted $B_{10}$ anions, described below, can be replaced by any other cations by exchange reactions carried out by well-known techniques, including, in particular, the use of cation-exchange resins. For example, hydrates of the acid $H_2B_{10}H_{10}$ can be prepared by simply acidifying the ammonium salt with a strong mineral acid such as HCl or by bringing a solution of the ammonium salt into contact with an acidic cation-exchange resin. The acid hydrates are isolated by evaporation, the degree of hydration depending on the extent of evaporation.

$B_{10}$ compounds containing Y and/or Z substituents (of Formula 1) are made by substitution reactions, in which hydrogens bonded to boron are replaced by Y and/or Z groups. These many reactions are described in detail in U.S. patent applications Ser. No. 324,885, filed Nov. 19, 1963; Ser. No. 237,392, filed Nov. 13, 1962; and Ser. No. 251,691, filed Jan. 15, 1963, all in the name of Walter H. Knoth, Jr., and all assigned to the same assignee as the assignee herein.

For example, halogen substituents are introduced into the $B_{10}H_{10}=$ anion by reaction of the appropriate halogen with $Na_2B_{10}H_{10}$. Specifically, the $B_{10}Cl_{10}=$ anion is formed by reacting chlorine with $Na_2B_{10}H_{10}$ at 10–25° C. in aqueous solution. The $B_{10}Br_{10}=$ anion is formed by reacting bromine with $Na_2B_{10}H_{10}$ in ethyl alcohol solution, first at 25° C. and then at reflux temperature (about 75–80° C.). The $B_{10}I_{10}=$ anion is formed by reacting iodine with $Na_2B_{10}H_{10}$ in methanol solution at 80° C., evaporating, and treating the product with iodine monochloride at 80° C. in the absence of a solvent.

Hydroxyl groups can be introduced indirectly into the $B_{10}$ nucleus as follows: $(NH_4)_2B_{10}H_{10}$ is reacted with an amide such as dimethylformamide, dimethylacetamide, or N-methylpyrrolidone in the presence of hydrogen chloride. The reaction is exothermic. After the heat of reaction has dissipated itself, the intermediate borane-amide adduct is reacted directly with hot aqueous sodium hydroxide to give the $B_{10}H_9OH=$ anion. If the dihydroxylated, $B_{10}H_8(OH)_2=$, anion is desired, the borane-amide reaction mixture is heated externally for an additional period before isolating the adduct for subsequent treatment with sodium hydroxide. $B_{10}$ anions containing both hydroxyl and halogen substituents are made by halogenating the hydroxylated anions. Specifically, the $B_{10}Cl_8(OH)_2=$ anion is formed by acidifying the alkaline solution of $Na_2B_{10}H_8(OH)_2$ described above with HCl and passing chlorine through the acid solution at 50° C.

Hydrocarbyloxyalkoxy groups are introduced into the $B_{10}H_{10}=$ anion by reaction of the appropriate methyl ether with a hydrate of the acid $H_2B_{10}H_{10}$. Specifically, the $B_{10}H_9OCH_2CH_2OCH_3=$ anion is formed by reaction 1,2-dimethoxyethane with an aqueous solution of $H_2B_{10}H_{10}$ at 70–80° C. $B_{10}$ anions containing both hydrocarbyloxyalkoxy and halogen substituents are made by halogenating the hydrocarbyloxyalkoxy-containing anions. Specifically, the $B_{10}Br_9OCH_2CH_2OCH_3=$ anion is formed by converting the hydrated acid $H_2B_{10}H_9OCH_2CH_2OCH_3$ to the sparingly soluble tetramethylammonium salt, which is reacted with bromine in aqueous methanol at about 25° C. to give $[(CH_3)_4N]_2B_{10}Br_9OCH_2CH_2OCH_3$.

Hydrocarbylcarbonyl groups are introduced into the $B_{10}H_{10}=$ anion by reaction of the appropriate acyl chloride with hydrated $H_2B_{10}H_{10}$. For example, reaction of benzoyl chloride with hydrated $H_2B_{10}H_{10}$ in 1,2-dimethoxyethane at 10° C. gives a solution containing hydrated $$H_2B_{10}H_9COC_6H_5$$

Unreacted $H_2B_{10}H_{10}$ is separated by precipitation as the sparingly soluble tetramethylammonium salt, and the acidic solution is neutralized with tetramethylammonium hydroxide to give the tetramethylammonium salt, $$[(CH_3)_4N]_2B_{10}H_9COC_6H_5$$

$B_{10}$ anions containing both hydrocarbylcarbonyl and halogen substituents are made by halogenating the hydrocarbylcarbonyl-substituted anions. Specifically, $$[(CH_3)_4N]_2B_{10}Cl_9COC_6H_5$$

is made by reacting chlorine with $$[CH_3)_4N]_2B_{10}H_9COC_6H_5$$

in acetonitrile solution at about 5° C.

Carboxyl groups are introduced into the $B_{10}H_{10}=$ anion by direct or indirect processes involving carbon monoxide. Direct reaction of a hydrate of $H_2B_{10}H_{10}$ with carbon monoxide at 130° C. and 1,000 atmospheres gives a solution containing $H_2B_{10}H_9COOH$, from which sparingly soluble salts such as $[(C_3H_7)_4N]_2B_{10}H_9COOH$ can be separated. To introduce more than one carboxyl group, $(NH_4)_2B_{10}H_{10}$ is first converted to the bisdiazonium compound $B_{10}H_8(N_2)_2$ by reaction with $NaNO_2/HCl$ in aqueous solution at 15° C. or lower, followed by reduction of the intermediate product (which is not isolated) with zinc and hydrchloric acid. The bisdiazonium compound is separated from the crude solid product by extraction with alcohol. Reaction of $B_{10}H_8(N_2)_2$ with carbon monoxide at 140° C. and 1,000 atmospheres, optionally in the presence of an inert diluent such as iron pentacarbonyl, gives $B_{10}H_8(CO)_2$, which on contact with water forms a hydrate of $H_2B_{10}H_8(COOH)_2$. The aqueous solutions that can be thus formed can be reacted directly with halogens to give the corresponding halogenated, carboxyl-containing $B_{10}$ anions.

As stated previously, compounds containing any cation in combination with the above-described substituted anions can be made by well-known exchange-reaction techniques. Specifically, hydrates of the acids $H_2B_{10}Cl_{10}$, $H_2B_{10}Br_{10}$, $H_2B_{10}I_{10}$, $H_2B_{10}Cl_8(OH)_2$, $H_2B_{10}Br_9OCH_2CH_2OCH_3$, and $H_2B_{10}Cl_9COC_6H_5$ are made by passing solution of salts containing the appropriate anions through columns packed with acidic cation-exchange resins. In some cases the solutions obtained directly from the substitution reactions can be used for the cation exchange; when an especially high purity is desired, a sparingly soluble salt such as a cesium or tetramethylammonium salt is precipitated first and purified, and a dilute solution thereof is then passed through the column. A salt of any of the above acids, e.g., $Na_2B_{10}Cl_{10}$, is obtained by neutralizing the acids with a hydroxide, oxide, or carbonate, e.g., NaOH, and evaporating.

The various types of Z groups defined just after Formula 1 are introduced into the $B_{10}H_{10}=$ anion as follows.

When Z is a tertiary amine, a tertiary phosphine, or a thio ether, it is introduced by reacting a compound containing the $B_{10}H_{10}=$ anion in an acid environment with the corresponding tertiary-amine oxide, tertiary-phosphine oxide, or sulfoxide. For example, $B_{10}H_8[S(CH_3)_2]_2$ is prepared as follows: Hydrogen chloride is bubbled through a mixture of $(NH_4)_2B_{10}H_{10}$, an approximately 75% molar excess of dimethyl sulfoxide, and glacial acetic acid. An exothermic reaction sets in; the temperature is held at about 60° C. until heat is no longer evolved (about 15 minutes) and then allowed to fall to ordinary temperatures. $B_{10}H_8[S(CH_3)_2]_2$ precipitates as a solid and is washed free of ammonium chloride with water. Introduction of only one $(CH_3)_2S$ group into the $B_{10}H_{10}=$ anion can be accomplished by using a lower $(CH_3)_2SO/(NH_4)_2B_{10}H_{10}$ molar ratio omitting the glacial acetic acid, and stopping the flow of hydrogen chloride after 4–5 minutes.

When Z is a sulfone or an N,N-disubstituted carboxamide, it is introduced by essentially the method just described and illustrated, except that the sulfone or carboxamide itself is used as the reactant.

As already stated in connection with the preparation of carboxyl derivatives, diazonium groups are introduced into the $B_{10}H_{10}=$ anion by reacting $(NH_3)_2B_{10}H_{10}$ with a nitrosating agent such as $HNO_2$ and then reducing the intermediate product thus formed with a metal-acid combination, e.g., zinc and hydrochloric acid. Nitriles as values of Z are introduced into the $B_{10}$ nucleus by heating a compound in which Z is diazonium, e.g., $B_{10}H_8(N_2)_2$, with the desired nitrile, which replaces one or both diazonium groups to give, for example, $B_{10}H_8(NCCH_3)_2$. Two carbonyl groups are introduced into the $B_{10}$ nucleus by reacting a bisdiazonium compound with carbon monoxide at elevated temperature and pressure. $B_{10}H_8(CO)_2$, as stated previously, is made from $B_{10}H_8(N_2)_2$ in this way.

As already indicated, $B_{10}$ compounds containing different Y and/or Z groups are made by sequential substitution reactions, in which each desired substituent is introduced in turn.

$B_{12}$ COMPOUNDS

The primary starting material for the preparation of the $B_{12}$ compounds is diborane, $B_2H_6$. Any alkali-metal salt of the acid $H_2B_{12}H_{12}$ can be prepared by the reaction of the appropriate alkali-metal hydroborate, e.g., $NaBH_4$, with diborane in the presence of an ether such as ethyl ether or 1,2-dimethoxyethane. The process is carried out in a closed system at a temperature of at least 100° C. and at autogenous pressure, which pressure should be at least three atmospheres. The product can be recrystallized from ethers such as ethyl ether or tetrahydrofuran or mixtures thereof. Any organic solvate of crystallization can be removed by mixing the product with water and distilling out the organic solvate. The product is then isolated by evaporation. The sodium salt is thus obtained as a hydrate, the exact degree of hydration depending on the extent of drying. Exactly as with the previously described $B_{10}$ anions, the sodium cation in $Na_2B_{12}H_{12}$, and the cations in any compounds containing $B_{12}H_{12}$ anions or substituted $B_{12}$ anions (described below) can be replaced by any other cations by exchange reactions carried out by well-known techniques, including, in particular, the use of cation-exchange resins. For example, hydrates of the acid $H_2B_{12}H_{12}$ can be prepared by simply acidifying the sodium salt with a strong mineral acid such as HCl or by bringing a solution of the sodium salt into contact with an acidic cation-exchange resin. The acid hydrates are isolated by evaporation, the degree of hydration obtained again depending on the extent of evaporation. These processes are described in assignee's copending application Ser. No. 246,636, filed Dec. 21, 1962, in the names of Henry C Miller and Earl L. Muetterties.

Halogen, hydroxyl, hydrocarbyloxyalkoxy, hydrocarbylcarbonyl, and carboxyl substituents can be introduced into the $B_{12}H_{12}$= anion by essentially the methods already described for their introduction into the $B_{10}H_{10}$= anion, and also by other methods that are not described above. Exceptions are noted below. These processes are described in detail in Ser. No. 246,636 and in assignee's copending copending application Ser. No. 225,966, filed Sept. 21, 1962, in the name of Walter H Knoth, Jr.

Specifically, chlorination of $B_{12}H_{12}$= to give $B_{12}Cl_{12}$= is carried out at a maximum temperture of 150° C. In the corresponding bromination of $B_{12}H_{12}$= to give $B_{12}Br_{12}$=, chlorine is passed through the mixture after an excess of bromine had been added and an exothermic reaction has taken place, the maximum temperature being about 50° C. In the corresponding iodination of $B_{12}H_{12}$= to give $B_{12}I_{12}$=, the first step is carried out in ethyl alcohol solution of about 25° C., and the intermediate product thus obtatined is then reacted with iodine monochloride. A mixture of fluorinated $B_{12}$ ions having the average composition $B_{12}H_{5.5}F_{6.5}$= is obtained by reacting $$Na_2B_{12}H_{12} \cdot H_2O$$

with anhydrous hydrogen fluoride at 200° C. in a closed system; the product is first isolated as the triethylammonium salt. The $B_{12}H_6Cl_6$= anion can be prepared by reacting a hydrate of $H_2B_{12}H_{12}$ in aqueous solution with chlorine at 0° C. until the color of chlorine persists; the product can be isolated as the tetramethylammonium salt.

The $B_{12}F_{11}OH$= anion is formed by passing fluorine diluted with nitrogen through an aqueous solution of $K_2B_{12}H_{12}$ at 0° C. for 50 hours and evaporating the volatile material at 90–100° C. Addition of cesium ion to a solution of the residual solid precipitates $Cs_2B_{12}F_{11}OH$ as sparingly soluble crystals. The $B_{12}H_3Cl_7(OH)_2$= ion is obtained as follows: The $B_{12}H_{10}(OH)_2$= ion is first formed in solution by the method used for making dihydroxylated $B_{10}$ anions. After acidification with hydrochloric acid, the solution is reacted with chlorine at the boiling point of the solution. Cooling and addition of tetramethylammonium hydroxide precipitate.

$$[(CH_3)_4N]_2B_{12}H_2Cl_8(OH)_2$$

which is separated by filtration. On slow evaporation of the filtrate $[(CH_3)_4N]_2B_{12}H_3Cl_7(OH)_2$ is recovered as a solid.

Three hydroxyl groups can be introduced into the $B_{12}H_{12}$= anion as follows: Aluminum metal is dissolved in an equivalent amount of an aqueous solution of $H_2B_{12}H_{12}$, the solution is evaporated, and the residue is dried at 25° C. over $P_2O_5$ to give $Al_2(B_{12}H_{12})_3 \cdot 16H_2O$. The salt is heated at 145° C. in a vacuum over $P_2O_5$ for 44.5 hours. The product is dissolved in dilute aqueous hydrochloric acid, and the solution is passed through an acidic cation-exchange column and neutralized with tetramethylammonium hydroxide. Evaporation gives $$[(CH_3)_4N]_2B_{12}H_9(OH)_3$$

Chlorination of the latter in aqueous solution at 5–95° C. gives $[(CH_3)_4N]_2B_{12}Cl_9(OH)_3$.

A solution of the acid $H_2B_{12}H_8(OH)_4$ in water can be made by refluxing a mixture of tert-butyl alcohol and a hydrate of $H_2B_{12}H_{12}$ for two hours, adding water, and distilling out the tert-butyl alcohol as an azeotrope with water.

$$\{[(CH_3)_3N]_2 \cdot BH_2\}_2B_{12}H_{12}$$

is prepared by reacting trimethylamine - borane, $(CH_3)_3N \cdot BH_3$, with diborane at 175° C. at the autogenous pressure of a closed system. The compound is obtained as a crystalline solid by extracting the crude solid product with hot water and cooling the extract. This process is described in U.S. 3,265,737 issued to Norman E. Miller.

Carboxyl groups are introduced into the $B_{12}H_{12}$= anion through reaction of a hydrate of $H_2B_{12}H_{12}$ with carbon monoxide at about 80° C. and 1000 atmospheres. Sublimation of the crude product, or extraction thereof with benzene, yields the compound $B_{12}H_{10}(CO)_2$, which reacts readily with water to give a solution of $$H_2B_{12}H_{10}(COOH)_2$$

Extraction of the crude product with water and addition of cesium ion precipitates the cesium salt of the monocarboxylic acid, $Cs_2B_{12}H_{11}(COOH)$. The foregoing description shows, incidentally, how carbonyl groups are introduced into the $B_{12}$ nucleus.

The Z substituents sulfone, N,N-disubstituted carboxamide, and N,N - disubstituted sulfonamide are introduced into the $B_{12}H_{12}$= anion in a manner similar to those described above for introducing sulfone and carboxamide groups into the $B_{10}H_{10}$= anion, viz., by heating the desired Z compound with a compound containing the $B_{12}H_{12}$= anion under acidic conditions. $B_{12}$ compounds containing the Z substituents tertiary amine and tertiary phosphine are prepared by reacting the corresponding tertiary amine-borane or tertiary phosphine-borane, $Z \cdot BH_3$, with diborane at about 175° C. at the autogenous pressure of a closed system. The foregoing processes are described in assignee's copending application Ser. No. 225,966, filed Sept. 21, 1962, in the name of Walter H. Knoth, Jr., and in U.S. 3,265,737 and U.S. 3,217,023, both in the name of Norman E. Miller.

As already indicated, and as is the case with the corresponding $B_{10}$ compounds, $B_{12}$ compounds containing different Y and/or Z substituents are made by sequential substitution reactions, in which each desired substituent is introduced in turn.

The following examples illustrate the products and process of the invention.

Example 1

A polyacrylonitrile fabric was wet thoroughly with an 8.1 aqueous solution of $H_2B_{10}H_{10}$. Excess liquid was pressed from the fabric, which was then dried in air at atmospheric conditions. The weight gain at this point was 14.7% of the weight of the original fabric. The fabric was now stiffer than an untreated control, had better static dissipation than the control, and was insoluble in dimethylformamide, whereas a control was soluble. It was heated at 150° C. for two hours, then rinsed in running tap water at about 40° C. for four hours, and dried. The weight gain was now 13.0% of the weight of the original fabric. The fabric was still stiffer than a control and insoluble in dimethylformamide. In addition, it had better receptivity for two basic dyes, namely, the dye of Example 2 of British Patent 807,241, hereinafter referred to as dye A, and the dye of Example VIII and claim 3 of U.S. Patent 2,821,526, hereinafter referred to as dye B.

Examples 2–13

By essentially the method of Example 1, with changes as noted, fabrics made from both polyacrylonitrile and from other polymers were treated with polyboron compounds to give significant changes in properties. The details of these experiments are summarized in Table I. The effects imparted to the fabrics by merely impregnating and air-drying were not lost on heating unless otherwise noted.

TABLE I.—TREATMENT OF FABRICS WITH POLYBORON COMPOUNDS

| Example No. | Polymer | Percent polyboron compound in aqueous solution | Percent weight gain after air-drying | Heating conditions, ° C./hr.: min. | Rinsing conditions, ° C./hr.: min. | Percent weight gain after heating and rinsing | Property changes (relative to untreated control) (1) After air-drying and (2) After heating and rinsing; remarks |
|---|---|---|---|---|---|---|---|
| 2 | Polyacrylonitrile | 10% $H_2B_{12}H_{12}$ | 16.8 | 150°/2:00 | 40°/4:00 | 16.0 | (1) Stiffer, insoluble in DMF[1] (control soluble), better static dissipation; (2) better receptivity for basic dyes. |
| 3 | do | 10% $H_2B_{10}Cl_{10}$ | 10.5 | 150°/2:00 | 40°/4:00 | 2.0 | (1) Stiffer, less soluble in DMF, better static dissipation; (2) better receptivity to basic dyes. |
| 4 | do | 10% $H_2B_{12}Cl_{12}$ | 8.9 | 150°/2:00 | 40°/4:00 | 1 | (1) Better static dissipation; (2) stiffer, insoluble in DMF. |
| 5 | do | Saturated $\{[(CH_3)_3N]_2BH_2\}_2B_2H_{12}$ | | 150°/1:00 | 40°/>2:00 | | (2) Stiffer, insoluble in DMF. |
| 6 | Polyhexamethyleneadipamide | 8.1% $H_2B_{10}H_{10}$ | 9.2 | 150°/2:00 | 40°/4:00 | 7.0 | (1) Better static dissipation; (2) stiffer, infusible (control melts at about 265° C.), insoluble in aqueous 90% formic acid (control soluble), better receptivity for the basic dyes A and B of Example 1. |
| 7A | do | 5% $H_2B_{12}H_{12}$ | 4.8 | 150°/2:00 | 40°/>2:00 | 4.5 | (2) Insoluble in aqueous 90% formic acid, more opaque. |
| 7B | do | 1% $H_2B_{12}H_{12}$ | 1.2 | 150°/2:00 | 40°/>2:00 | 0.9 | (2) Largely insoluble in aqueous formic acid. |
| 8 | do | 10% $H_2B_{10}Cl_{10}$ | 9.1 | 150°/2:00 | 40°/>2:00 | 6 | (1) Stiffer, better static dissipation; (2) stiffer. |
| 9 | do | 10% $Na_2B_{12}H_{12}$ | 16.0 | 150°/1:00 | 40°/2:00 | 2.4 | (2) Stiffer, more opaque. |
| 10 | do | 10% $(NH_4)_2B_{10}H_{10}$ | 10.0 | 150°/1:00 | 40°/2:00 | | (2) Partly insoluble in aqueous 90% formic acid. |
| 11 | Polyethylene terephthalate | 8.1% $H_2B_{10}H_{10}$ | 15.8 | | | | (1) Infusible (control melts at 267° C.), better static dissipation. |
| 12A | do | 10% $H_2B_{12}H_{12}$ | 24.1 | 150°/2:00 | 40°/4:00 | 8.0 | (1) Infusible, better static dissipation; (2) same; also partly insoluble in phenol/trichlorophenol (10/7) (control soluble). |
| 12B | do | 10% $H_2B_{12}H_{12}$ | 24.1 | 200°/1:00 | 40°/4:00 | | (2) Insoluble in phenol/trichlorophenol (10/7); kept orientation (i.e., did not shrink in this solvent at its boiling point). |
| 13A | Polypivalolactone | 10% $H_2B_{12}H_{12}$ | 37 | 150°/1:00 | 40°/2:00 | | (2) Better static dissipation, better receptivity for basic dyes. |

[1] DMF is dimethylformamide.

Example 13-B

A polypivalolactone broadcloth fabric was wet with an aqueous 1% solution of $H_2B_{12}H_{12}$ and heated at 175° C. for 30 minutes. After being impregnated with soil by the method of Wagg, J. Textile Inst. 43, 515 (1952) and laundered, the fabric had 95% of its original light reflectance, whereas an untreated control regained only 84% of its original reflectance. The corresponding figures for soiling by the method of Sanders and Lamber, J. Am. Oil Chemists Soc. 27, 153 (1950) were 91% for the fabric treated with $H_2B_{12}H_{12}$ and 76% for an untreated control.

The soil repellency of a polyethylene terephthalate fabric was also improved by treatment with $H_2B_{12}H_{12}$.

Example 14

By the method of Example 1, a polyhexamethyleneadipamide nylon fabric was wet with a 10% aqueous solution of $H_2B_{12}H_{12}^-$ and air-dried. The weight gain at this point was 18.1%. The treated fabric was infusible, whereas an untreated control melted at about 265° C. In addition, the treated fabric had better static dissipation than a control. It remained colorless when heated a 150° C. for four days, whereas a control turned yellow after heating at 150 C. for only two hours. After being rinsed in running tap water at about 40° C. for four hours, the fabric had developed an opacity similar to that of cotton broadcloth.

Fabrics that had been similarly impregnated and air-dried were heated as shown in Table II, extracted with 40° C. running tap water, and air-dried. The opacity values in the last column of Table II refer to an arbitrary scale in which 1 corresponds to a relatively translucent fabric like untreated nylon and 4 corresponds to a relatively opaque fabric like cotton broadcloth.

TABLE II

| Heating conditions, ° C./hr.:min.: | Percent weight gain after heating and rinsing | Opacity |
| --- | --- | --- |
| 150°/0:05 | 9.3 | 3 |
| 150°/0:30 | 12.3 | 2 |
| 150°/1:00 | 13.1 | 2 |
| 150°/2:00 | 10.2 | 2 |
| 100°/0:05 | 2.9 | 3.5 |
| 100°/0:30 | 4.5 | 3.5 |
| 100°/1:00 | 3.8 | 3.5 |
| 100°/2:00 | 7.8 | 3.5 |

The results in Table II show that the degree of opacification can be controlled by variations in the time and temperature of heating. All the fabrics treated as described in Table II had improved receptivity for basic dyes.

Example 15

By the method of Example 1, a polyethylene terephthalate fabric was wet with a 7.7% aqueous solution of $Na_2B_{10}Cl_{10}$ and air-dried. The fabric was then wet with a 10% aqueous solution of tetramethylammonium chloride, rinsed briefly in 40° C. tap water, and air-dried. The latter step converted the $Na_2B_{10}Cl_{10}$ originally present in the fabric to the sparingly soluble $[(CH_3)_4N]_2B_{10}Cl_{10}$. The weight gain at this point was 2.5%. The treated fabric remained tough and unmelted after being heated at 250° C. in air for 24 hours, whereas a control melted within one hour. The treated fabric was rubbery at temperatures above about 280° C.

Example 16

By the method of Example 15, a polyethylene terephthalate fabric was treated with $[(CH_3)_4N]_2B_{12}Cl_{12}$ by the use of $Na_2B_{12}Cl_{12}$ and tetramethylammonium chloride. The weight gain after the second air-drying was 3.2%. The same changes in properties described in Example 15 were observed.

Example 17

By the method of Example 15, a polyhexamethyleneadipamide nylon fabric was wet with aqueous 1.7% $H_2B_{12}I_{12}$ and then with aqueous 10% antimony trichloride, to give a product impregnated with $Sb_2(B_{12}I_{12})_3$. The weight gain after the second air-drying was 1.2%. The treated fabric resisted burning in a free flame better than did an untreated control.

Example 18

By the method of Example 15, a skein of yarn of a polytetramethylene ether glycol/4,4'-diisocyanatodiphenylmethane/1,4 - diaminopiperazine terpolymer (an elastic urethane fiber) was wet with 7.9% $H_2B_{12}Cl_{12}$ and then with aqueous 10% tetramethylammonium chloride to give a material impregnated with $[(CH_3)_4N]_2B_{12}Cl_{12}$. After being stored in a laboratory atmosphere for two months, in the presence of diffused sunlight during daytime hours, the treated skein was less discolored than an untreated control.

Example 19

A polyacrylonitrile fabric was wet thoroughly with dyes designated in the "Colour Index" as Nos. 61,505 of water, and 1.0 g. of the acid dye designated in the "Colour Index," 2nd edition, as No. 23,635. Excess liquid was pressed from the fabric, and the fabric was dried at 100° C. for 30 minutes, heated at 150° C. for five minutes, and extracted repeatedly with hot water until fresh extracts were colorless. The final fabric was much more heavily dyed than was a control that was dyed similarly but in the absence of $H_2B_{12}H_{12}$. Similar increases in dye receptivity were observed when the acetate dyes designated in the "Colour Index" as Nos. 61,505 and 11,110 and the basic dyes A and B of Example 1 were substituted in the above procedures for dye No. 23,635.

Example 20

A biaxially oriented, 0.0001" film of polyethylene terephthalate was wet with a 1.0% aqueous solution of $H_2B_{12}H_{12}^-$/surface-active agent (10/1), the surface-active agent being a commercial, nonionic ethylene oxide/octylphenol reaction product. Excess liquid was drained briefly from the film, and the film was heated at 200° C. for five minutes and rinsed in 40° C. running tap water for two hours. After air-drying, the weight gain was 1.4%. The treated film retained its original high clarity. It had better static dissipation and was more readily wetted by water than a control that had been similarly treated with a solution containing the surface-active agent but no $H_2B_{12}H_{12}$.

Another 0.001" film of polyethylene terephthalate, treated by essentially the process of the foregoing example, made a contact angle of 24° with a drop of water, whereas an untreated film made a contact angle of 75°. The contact angle made by the treated film remained essentially unchanged (21°) after the film was immersed in boiling water for one hour. These angles indicate much improved hydrophilicity for the treated film over the control.

Example 21

A biaxially oriented, 0.001" film of polyethylene terephthalate was wet with a 1.0% aqueous solution of $H_2B_{12}H_{12}$/sodium lauryl sulfate (10/1). Excess liquid was drained briefly from the film, and the wet film was dryed by heating at 80° C. for 15 minutes. The weight gain at this point was 0.6%, which is equivalent to 0.01 mg./cm.$^2$. The treated film was applied to a 0.0065" film of low-density polyethylene, and the two were pressed together at 200° C. and a pressure of 300 lb./sq. in. for five minutes. The resulting laminate had good adhesion, its peel strength being about 1,000 g./in. By contrast, a laminate made with an untreated polyethylene terephthalate film had a peel strength of less than 50 g./in., as did a laminate of a polyethylene terephthalate film that had been treated as described above with aqueous 0.01% sodium lauryl sulfate in the absence of $H_2B_{12}H_{12}$.

The treated film also had improved adhesion to linear polyethylene, natural rubber, and an ethylene/propylene copolymer elastomer.

By the method of Example 21, films of other polymers were treated with $H_2B_{12}H_{12}$, and the adhesion of the treated films to various substrates was measured. The results are summarized in Table III.

TABLE III

| Treated Polymer | Substrate | Adhesion (g./in.) Treated | Adhesion (g./in.) Untreated |
|---|---|---|---|
| Low-density polyethylene | Natural rubber | 1,100 | 150 |
|  | Polyethylene terephthalate | 1,090 | <50 |
|  | Low-density polyethylene | 900 | 75 |
|  | Linear polypropylene | 300 | <50 |
| Polyvinyl fluoride | Natural rubber | 1,150 | <50 |
|  | Ethylene/propylene copolymer elastomer | 1,700 | <50 |
|  | Low-density polyethylene | 350 | 150 |
|  | Natural rubber | 1,500 | 225 |
| Poly(pyromellitimidodiphenyl ether) | Ethylene/propylene copolymer elastomer | 3,400 | 175 |
|  | Polyhexamethyleneadipamide | 900 | 300 |
|  | Hexafluoropropylene/tetrafluoroethylene copolymer | 600 | <50 |
|  | Linear polyethylene | 700 | <50-200 |
| Polyhexamethyleneadipamide | Natural rubber | 1,000 | 400 |
|  | Ethylene/propylene copolymer elastomer | 2,400 | <50 |

Example 22

By the method of Example 20, a 0.002" film of low-density polyethylene was wet with an aqueous 1% solution of $H_2B_{12}H_{12}$/sodium lauryl sulfate (10/1), heated at 100° C. for one hour, rinsed in 40° C. running tap water for two hours, and dried. The treated film had better static dissipation, better printability, better receptivity for basic dyes, and a more hydrophilic surface than a polyethylene film treated as described above with aqueous 1% sodium lauryl sulfate in the absence of $H_2B_{12}H_{12}$.

Treatment of a 0.0005" film of biaxially oriented, linear polypropylene by the method just described gave similar improvements in static dissipation, printability, and hydrophilicity over a control.

Example 23

By the method of Example 20, a 0.0065" film of low-density polyethylene was wet with an aqueous 1.0% solution of $H_2B_{12}H_{12}$/sodium lauryl sulfate (10/1). The wet film was dried at 80° C. for 15 minutes. The weight gain at this point was 0.2%, which is equivalent to 0.02 mg./cm.$^2$. The treated film was applied to a 0.002" film of polyvinyl fluoride, and the two were pressed together at 200° C., following which the laminate was heated in the absence of pressure at 200° C. for five minutes. The resulting laminate had a peel strength of about 2000 g./in., whereas controls made from untreated polyethylene and from polyethylene that had been treated only with 0.1% aqueous sodium lauryl sulfate had peel strengths of less than 100 g./in.

Example 24

A 0.0015" film of low-density polyethylene was wet with a 10% aqueous solution of $H_2B_{10}H_{10}$. Excess liquid was drained from the film, the wet film was covered with a similar film of untreated polyethylene, and the combination was air-dried for 30 minutes and then heated at 100° C. for 30 minutes. The covering film was removed, and the treated film was heated further at 150° C. for 30 minutes. During this last heating it melted, and it resolidified after cooling to room temperature. It was then rinsed for two hours in running tap water and air-dried. The weight gain at this point was 0.4%. The film had better wettability by water and better receptivity for basic dye A of Example 1 than did an untreated control.

Similar effects were produced in a film of polyvinyl chloride when it was treated as described above.

Example 25

A 0.001" film of biaxially oriented polyvinyl chloride was wet with a 10% ethyl alcohol solution of hydrated $H_2B_{12}H_{12}$ having the average composition $H_2B_{12}H_{12} \cdot 6.4H_2O$, and excess liquid was drained from the film. The wet film was covered with a similar, untreated, polyvinyl chloride film, and the combination was heated at 100° C. for 30 minutes. The covering film was removed, and the treated film was soaked 18 hours in water, rinsed briefly in 40° C. water, and air-dried. The weight gain was 2.8%. The treated film was more readily wet by water than was a control film that had been carried through the same heating and rinsing procedure.

Example 26

The results in Table IV, below, show how treatment with $H_2B_{12}H_{11}COOH$ improved the adhesion of films of various polymers to various substrates. In each experiment, a film of the polymer of the first column was wet with a 1.0% aqueous solution of $H_2B_{12}H_{11}COOH$/sodium lauryl sulfate (10/1), drained for one minute, heated at 90° C. for 15 minutes, and laminated to the substrate by pressing at 300 lb./sq. in. and the indicated temperature. Exceptions to this procedure are given in footnotes.

TABLE IV

| Treated Film | Substrate | Laminating temp. (° C.) | Adhesion (g./in.) Treated polymer | Adhesion (g./in.) Control |
|---|---|---|---|---|
| Polyethylene terephthalate | Low-density polyethylene [1] | 200 | 1,600 | <50 |
|  | Natural rubber | 160 | 1,450 | <50 |
|  | Ethylene/propylene copolymer elastomer | 200 | 1,300 | <50 |
| Poly(pyromellitimidodiphenyl ether) | Natural rubber | 200 | 950 | 225 |
|  | Ethylene/propylene copolymer elastomer | 200 | >1,600 | 175 |
| Polyhexamethyleneadipamide | Natural rubber | 200 | 900 | 400 |
| Low-density polyethylene | Polyacrylonitrile [2] | 200 | 600 | <50 |

[1] Used 0.3% treating solution instead of 1.0%.
[2] Applied from 10% solution in dimethylformamide and dried 30 minutes at 25° C., 30 minutes at 80° C., and finally 15 minutes at 108° C.

Example 27

A sheet of white bond paper was wet with an aqueous 6% solution of $H_2B_{10}Cl_{10}$ and air-dried. The weight gain was 5.9%. The paper was still white and was not discolored by exposure at room temperature to sunlight through glass or to diffuse fluorescent light. When part of the treated paper was placed on a metal block and covered with a glass plate, and the block was heated in air at about 6–8° C. temperature increase per minute, the paper turned black at 122–132° C. Another part of the treated paper was covered with a black image on white paper, and the combination was illuminated from above for a few seconds with strong incandescent light. A sharp black-on-white image was formed in the treated paper, the black areas of which corresponded to the black areas of the original image. Similar images were formed on sheets of cellophane, cellulose acetate, polyvinyl alcohol, polyvinyl acetate, and polyvinyl fluoride when they were treated with $H_2B_{10}Cl_{10}$ and illuminated by this method.

Examples 28–38

By the method of Example 27, samples of white bond paper were treated with aqueous solutions of the polyboron compounds listed in Table V. As shown in the table, all the treated papers became colored when heated to about 100–135° C.

TABLE V

| Example No. | Polyboron Compound | Weight gain | Temperature (° C.) of First Appearance of | |
|---|---|---|---|---|
| | | | Gray color | Dark-gray color |
| 28 | $H_2B_{10}Cl_9COC_6H_5$ | 6.5 | 107 | 127 |
| 29 | $H_2B_{10}Cl_8(OH)_2$ | 6.4 | 114 | 124 |
| 30 | $H_2B_{10}Br_{10}$ | 9.5 | 111 | 122 |
| 31 | $H_2B_{10}Br_9OCH_2CH_2OCH_3$ | 5.7 | 116 | >127 |
| 32 | $H_2B_{10}I_{10}$ | 6.8 | 100 | 135 |
| 33 | $H_2B_{12}F_{11}OH$ | 12.3 | 100 | 125 |
| 34 | $H_2B_{12}H_{5.5}F_{6.5}$ | 3.3 | 109 | 127 |
| 35 | $H_2B_{12}Cl_{12}$ | 14.2 | 105 | 117 |
| 36 | $H_2B_{12}Cl_9(OH)_3$ | 6.3 | 108 | 127 |
| 37 | $H_2B_{12}Br_{12}$ | 11.2 | 113 | 124 |
| 38 | $H_2B_{12}I_{12}$ | | 114 | 135 |

1 Average compositon of a mixture of acids.

Example 39

To 14.8 g. of an 11.2% solution of polyvinyl acetate in benzene was added 1.66 g. of $H_2B_{12}H_{12} \cdot 6H_2O$, followed by 5 ml. of ethyl alcohol. A thick, hazy gel formed. It was isolated by decantation and dissolved in 20 ml. of benzene/ethyl alcohol (1/1). The solution was flowed out on a glass plate and air-dried to give a clear, tacky film. A portion of the film was rinsed for eight hours in cold running tap water and air-dried. It was stiff, hazy, and tough and contained 1.2% boron. Another portion of the film was heated at 150° C. for two hours, cooled, rinsed for six hours in cold running tap water, and air-dried. The film then contained 38.9% boron and had strong absorption at $3.9\mu$ in the infrared, indicating the presence of B—H bonds. It was insoluble in benzene and infusible, whereas an untreated control was fusible at about 125° C. and soluble in benzene.

Example 40

A 10% dispersion in water of a polyamine acetate of molecular weight about 1600, prepared from an ethylene/carbon monoxide (11.1/1) copolymer as described in U.S. 2,579,033, was treated with an equal volume of an aqueous 10% solution of $Na_2B_{12}H_{12} \cdot 2H_2O$. The dispersed solid coagulated to a soft, yellow paste. The latter was washed with water and air-dried to give a soft, yellow residue that melted to a clear, viscous liquid at 80° C. and resolidified to a hard, clear film on cooling. The film burned slowly with intumescence and left a black residue, whereas an untreated polyamine acetate burned readily and completely, without intumescence.

Example 41

A coating composition (10 g.) comprising (a) seven parts of a xylene solution of a polyester alkyd resin made from short coconut oil acids and 5% excess glycerol and (b) three parts of a butanol solution of a melamine/formaldehyde resin was combined with 0.02 g. of $H_2B_{12}Cl_{12} \cdot 6H_2O$, and the mixture was kept for about 18 hours at room temperature. Wet films of the clear solution were prepared on glass with a doctor knife set at 0.01" and heated at 83° C. for 30 minutes. The resulting solid coatings were insoluble in acetone. When the coating was prepared as described above in the absence of $H_2B_{12}Cl_{12} \cdot 6H_2O$, it was soluble in acetone.

Example 42

A copolyurea-urethane prepared from a polytetramethylene ether glycol of M.W. ca. 1000, 4-methyl-1,3-phenylene diisocyanate, methylenebis(4-phenyl isocyanate), hydrazine hydrate, and methyliminobis(propylamine), dissolved in dimethylformamide, was mixed with approximately one-tenth its volume of a 5% solution of $H_2B_{12}H_{12}$ in dimethylformamide. A liquid film was cast on glass with a doctor knife set at 0.05" and was heated at 160° C. for three minutes. The resulting solid film was insoluble in hexamethylphosphoramide, whereas a similar film prepared in the absence of $H_2B_{12}H_{12}$ was soluble.

Example 43

$Na_2B_{12}H_{12}$ (five grams) was milled into low-density polyethylene (100 g.) at 150° C. until a homogeneous mixture was obtained (about five minutes). The milled sample was partly insoluble in hot xylene, whereas the untreated polyethylene was soluble. The infrared absorption spectrum of the treated polyethylene showed that carboxyl groups initially present in the polymer had been removed, and that carbonyl groups, normally generated during such a milling operation in the absence of $Na_2B_{12}H_{12}$, had not appeared. Thus, the $Na_2B_{12}H_{12}$ had acted as a scavenging agent for one form of combined oxygen in the polymer and as an inhibitor to prevent the introduction of combined oxygen in another form.

Example 44

A polyethylene terephthalate fabric was wet with aqueous 0.4% $H_2B_{12}H_{12}$, heated at 200° C. for one minute, rinsed with an aqueous solution of tetramethylenepentamine, dipped in a resorcinol/formaldehyde adhesive, and bonded to a filled natural-rubber stock at 157° C. for 30 minutes. The resulting laminate had an adhesion of 36 lb./in. at 145° C., whereas an untreated control had an adhesion of only 8 lb./in.

Example 45

A polyethylene terephthalate fabric was padded with an aqueous 0.5% solution of $H_2B_{12}H_{12}$ and heated at 195° C. for five minutes. The treated fabric was uncolored and had good static dissipation, even after the following successive treatments:

(a) washing with a standard commercial detergent
(b) treatment with aqueous calcium hydroxide
(c) treatment with boiling aqueous sodium lauryl sulfate for 30 minutes
(d) dry-cleaning with perchloroethylene In addition, the static dissipation was maintained after five laboratory washes and ten commercial washing/ironing cycles. The treated fabric was also more resistant to dry soiling and to oily soiling than an untreated control.

Example 46

A wool fabric was wet with a 1.0% aqueous solution of $H_2B_{12}H_{12}$/sodium lauryl sulfate (10/1), air-dried for 30 minutes, and heated at 200° C. for five minutes. The treated fabric had better static dissipation and had become less colored than an untreated control that was also heated at 200° C. for five minutes.

Examples 47–55

By the method of Example 21, except that the drying was conducted at 90° C. instead of 80° C., films of biaxially oriented polyethylene terephthalate were treated with various polyboron compounds and then laminated to low-density polyethylene. The results of the treatment were summarized in Table VII.

TABLE VII

| Example: | Polyboron Compound | Adhesion (g./in.) |
|---|---|---|
| 47 | $H_2B_{10}H_{10}$ | 1,200–1,400 |
| 48 | $(NH_4)_2B_{12}H_{12}$ | 500 |
| 49 | $H_2B_{12}H_6Cl_6$ | 100–800 |
| 50 | $H_2B_{12}Cl_{12}$ | 100–300 |
| 51 | $H_2B_{12}H_8(OH)_4$ | 1,600 |
| 52 | $H_2B_{12}H_{11}OH$ | 1,600 |
| 53 | $H_2B_{12}H_2Cl_9OH$ | 1,400 |
| 54 | $H_2B_{12}H_3Cl_7(OH)_2$ | 100–1,100 |
| 55 | $H_2B_{12}H_{10}(COOH)_2$ | 1,100–1,250 |

As noted in Example 21, untreated control laminates had adhesions of less than 50 g./in.

Example 56

A polyhexamethyleneadipamide nylon fabric was wet thoroughly with a 3.3% solution of $B_{10}H_8[S(CH_3)_2]_2$ in chloroform, excess liquid was squeezed out, and the fabric was allowed to air-dry at room temperature. The weight gain was 7.6%. The treated fabric was markedly stiffer and crisper. Its static dissipation was better than that of an untreated control. It had better receptivity for dyes A and B of Example 1 than did an untreated control. When the treated fabric was immersed in 60° C. running tap water for one hour, it remained stiff, and the weight gain was reduced only to 5.0%.

When polyethylene terephthalate fabric was similarly treated with $B_{10}H_8[S(CH_3)_2]_2$, the weight gain was 5.6%, and this was reduced only to 4.0% upon rinsing one hour in 60° C. running tap water. The treated fabric was markedly stiffer and crisper than a control and it had better receptivity for the acid dyes designated by "Colour Index" Nos. 23,635 and 62,085, the direct dyes designated by Nos. 24,895 and 28,160, and dyes A and B of Example 1.

When a knitted fabric of an acrylonitrile/methyl acrylate/sodium styrenesulfonate (94/5.7/0.3) copolymer was similarly treated with $B_{10}H_8[S(CH_3)_2]_2$, the treated fabric had a weight gain of 15.9%, and this was reduced only to 14.1% by rinsing for one hour in running 60° C. tap water. The treated fabric was markedly stiffer than an untreated control and it had better static dissipation.

Example 57

A knitted fabric of an acrylonitrile/methyl acrylate/sodium styrenesulfonate (94/5.7/0.3) copolymer was wet thoroughly with an aqueous 1.3% solution of $HB_{10}H_9S(CH_3)_2$, excess liquid was pressed out, and the fabric was air-dried at room temperature. The weight gain was 1.9%, and the fabric had better static dissipation than an untreated control. It was heated at 200° C. for five minutes, rinsed for three hours in running tap water at about 60° C., and air-dried. The net weight gain was 1.3%. The fabric had better receptivity than an untreated control for the basic dyes A and B of Example 1 and for the acetate dyes Nos. 11,110 and 61,505 of the "Colour Index."

A polyethylene terephthalate fabric was treated with $HB_{10}H_9S(CH_3)_2$ as described above. The initial weight gain was 0.6%, and the treated fabric had improved static dissipation. The weight gain after heating, rinsing, and drying was 0.4%, and the fabric had improved receptivity for the basic dyes A and B of Example 1.

As discussed previously and as evidenced by the examples, the property changes obtained by the process of the invention depend upon the nature of the polymer and of the polyboron compound used. The property changes previously listed make the utility of the modified polymers obvious.

For example, increased static dissipation, which is a property change common to a number of the polymers covered here, makes obvious the use of the modified polymers in the field of textiles and fabrics. The desirability of polymeric fibers with static dissipating properties is self-evident. In addition, the properties of increased hydrophilicity and dyeability evidence utility in areas of textiles and fabrics. Hydrophilicity is important in producing clothing comfortable to the wearer and increased dyeability makes colored or tinted polymers available for a variety of uses. Reduction of oxygen content is important in materials used outdoors, for the lower the oxygen content the greater the resistance of the material toward degradation. Increased adhesion is an important property in polymers used in combination with a substrate.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A process for modifying polyesters which comprises treating a polyester that is essentially free of ethylenic and acetylenic carbon-carbon unsaturation and which contains carbon-hydrogen bonds with a polyboron compound of the formula $$(M^{v+})_a[(B_nH_{n-p-r}Y_pZ_r)^{(2-r)-}]_b$$

wherein:

M is a cation;

$v$ is the valence of the cation;

Y is a monovalent group selected from the class consisting of halogen, hydroxyl, carboxyl, hydrocarbyloxyalkoxy free of ethylenic and acetylenic carbon-carbon unsaturation and containing up to 18 carbon atoms, and hydrocarbylcarbonyl free of ethylenic and acetylenic carbon-carbon unsaturation and containing up to 18 carbon atoms;

$n$ is a cardinal number selected from the class consisting of 10 and 12;

$p$ is a cardinal number of from 0 to n-r, inclusive;

$r$ is a cardinal number of from 0 to 2, inclusive;

Z is a group selected from the class consisting of tertiary amines, tertiary phosphines, sulfones, N,N-disubstituted carboxamides, carbonyl when $r$ is 2, thio ethers when $n$ is 10, nitriles when $n$ is 10, diazonium when $n$ is 10, and N,N-disubstituted sulfonamides when $n$ is 12, wherein all organic radicals in said groups are hydrocarbyl groups free of ethylenic and acetylenic carbon-carbon unsaturation containing up to 18 carbon atoms; and $a$ and $b$ are the smallest cardinal whole numbers satisfying the equation $$a = \frac{(2-r)b}{v}$$

$b$ being at least 1, and begin 1 when $a$ is 0; said treatment being carried out at a temperature of between 0° and 350° C.

2. The process of claim 1 wherein the polyester is further defined as one in which (1) at least one-half the intralinear atoms are carbon atoms, (2) at least one-half of the intralinear carbon atoms are bonded to hydrogen, and (3) the intralinear atoms other than carbon are selected from the class consisting of oxygen, sulfur and nitrogen, and, when nitrogen, the third bond is bonded to a group selected from the class consisting of hydrogen and alkyl of up to eight carbon atoms.

3. The process of claim 1 in which the polyboron compound has the formula $$B_nH_{n-p-2}Y_pZ_2$$

wherein $n$, $p$, Y and Z are defined as in claim 1.

4. The process of claim 1 in which the polyboron compound has the formula $$(M^{v+})_a(B_nH_{n-p}Y_p)_b$$

wherein M, v, a, n, p, Y and b are defined as in claim 1.

5. The process of claim 4 in which p is at most equal to one-half n.

6. The process of claim 1 in which Y is halogen.

7. The process of claim 5 in which Y is halogen.

8. The process of claim 1 in which the polyboron compound is $M_a(B_nH_n)_b$ wherein M, n, a and b are defined as in claim 1.

9. The process of claim 2 in which the polyboron compound is $M_a(B_nH_n)_b$ wherein M, n, a and b are defined as in claim 1.

10. The process of claim 1 in which the polyboron compound is $H_2B_nH_n$ wherein n is defined as in claim 1.

11. The process of claim 1 wherein the polyester is polypivalolactone and the polyboron compound is $$H_2B_{12}H_{12}$$

12. The process of claim 1 wherein the polyester is polyethylene terephthalate and the polyboron compound is $H_2B_{12}H_{11}COOH$.

13. The process of claim 1 wherein the polyester is polyethylene terephthalate and the polyboron compound is $H_2B_{12}H_{12}$.

14. The reaction product of a polyester that is essentially free of ethylenic and acetylenic carbon-carbon unsaturation and which contains carbon-hydrogen bonds; and at least 0.001% based on the weight of said polyester, of a polyboron compound of the formula $$(M^{v+})_a[(B_nH_{n-p-r}Y_pZ_r)^{(2-r)-}]_b$$

wherein:

M is a cation;

v is the valence of the cation;

Y is a monovalent group selected from the class consisting of halogen, hydroxyl, carboxyl, hydrocarbyloxyalkoxy free of ethylenic and acetylenic carbon-carbon unsaturation and containing up to 18 carbon atoms, and hydrocarbylcarbonyl free of ethylenic and acetylenic carbon-carbon unsaturation and containing up to 18 carbon atoms;

n is a cardinal number selected from the class consisting of 10 and 12;

p is a cardinal number of from 0 to n–r, inclusive;

r is a cardinal number of from 0 to 2, inclusive;

Z is a group selected from the class consisting of tertiary amines, tertiary phosphines, sulfones, N,N-disubstituted carboxamides, carbonyl when r is 2, thio ethers when n is 10, nitriles when n is 10, diazonium when n is 10, and N,N-disubstituted sulfonamides when n is 12, wherein all organic radicals in said groups are hydrocarbyl groups free of ethylenic and acetylenic carbon-carbon unsaturation containing up to 18 carbon atoms; and a and b are the smallest cardinal whole numbers satisfying the equation $$a = \frac{(2-r)b}{v}$$

b being at least 1, and being 1 when a is 0.

15. The composition of claim 14 in which the polyester is polyethylene terephthalate and the polyboron compound is $H_2B_{12}H_{12}$.

16. The composition of claim 14 in which the polyester is polypivalolactone and the polyboron compound is $H_2B_{12}H_{12}$.

References Cited

UNITED STATES PATENTS 2,558,559   1/1951   Hurd et al. _____ 260—83.3

OTHER REFERENCES

Knoth et al.: J. Am. Chem. Soc. 84, pp. 1056–57 (1962).

WILLIAM H. SHORT, *Primary Examiner.*

M. GOLDSTEIN, *Assistant Examiner.*

U.S. Cl. X.R.

8—128; 106—168, 169, 197, 198; 260—2, 59, 67, 67.6, 69, 71, 75, 77.5, 78, 78.3, 78.5, 79.1, 79.3, 80, 80.71, 83.5, 85.5, 87.5, 87.7, 88.1, 88.2, 88.7, 89.1, 89.5, 89.7, 91.1, 91.3, 91.5, 91.7, 92.1, 92.3, 93.5, 93.7, 94.8, 94.9, 96, 112, 212, 223, 230, 232, 484, 485

PO-1050
(5/69)

UNITED STATES PATENT OFFICE
CERTIFICATE OF CORRECTION

Patent No. 3,454,623          Dated July 8, 1969

Inventor(s) Boynton Graham

It is certified that error appears in the above-identified patent and that said Letters Patent are hereby corrected as shown below:

Column 4, line 20, "benzonitrile;" should be -- benzonitrile);--. Column 6, line 72, the "-" after "(2-r)" should be a superscript. Column 9, line 52, "lmost" should be -- most --. Column 12, line 57, "polydiolefiins" should be -- polydiolefins --. Column 15, line 66, "$H_2B_{10}H_9COC_8H_5$" should be -- $H_2B_{10}H_9COC_6H_5$ --. Column 17, line 63, "of" should be -- at --. Column 18, line 11, delete the period after "precipitate". Column 19, line 7, "8.1" should be -- 8.1% --; Table I, Example 5, that portion of the formula reading "$-B_2H_{12}$" should read -- $-B_{12}H_{12}$ --. Column 20, line 71, "Lamber" should be -- Lambert --. Column 21, line 8, after "heated", "a" should be -- at --. Column 22, lines 11 and 12, "dyes designated in the 'Colour Index' as Nos. 61,505 of water, and 1.0 g. of the acid dye" should be -- a dyebath mixture containing 1.0 g. of $H_2B_{12}H_{12}$, 20 g. of water, and 1.0 g. of acid dye --. Column 22, line 28, "0.0001" should be -- 0.001 --. Column 25, Table V, Example 31, that portion of the formula reading "$-CH_2OCH$" should read -- $-CH_2OCH_3$ -- and the formula given for Example 34 should be followed by a superscript -- 1 -- referring to the footnote. Column 28, line 55 (Claim 1), "begin" should be -- being --.

Signed and sealed this 20th day of February 1973.

(SEAL)
Attest:

EDWARD M. FLETCHER, JR.          ROBERT GOTTSCHALK
Attesting Officer          Commissioner of Patents